United States Patent
Kurosaki et al.

(10) Patent No.: US 12,025,244 B2
(45) Date of Patent: Jul. 2, 2024

(54) INNER RING AND PIPE JOINT

(71) Applicant: NIPPON PILLAR PACKING CO., LTD., Osaka (JP)

(72) Inventors: Ayumi Kurosaki, Osaka (JP); Shingo Higuchi, Osaka (JP); Kazukiyo Teshima, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 29 days.

(21) Appl. No.: 17/916,306

(22) PCT Filed: Mar. 9, 2021

(86) PCT No.: PCT/JP2021/009203
§ 371 (c)(1),
(2) Date: Sep. 30, 2022

(87) PCT Pub. No.: WO2021/250958
PCT Pub. Date: Dec. 16, 2021

(65) Prior Publication Data
US 2023/0151911 A1    May 18, 2023

(30) Foreign Application Priority Data

Jun. 9, 2020  (JP) .................................. 2020-100307

(51) Int. Cl.
*F16L 19/05* (2006.01)
*F16J 15/10* (2006.01)

(52) U.S. Cl.
CPC ............... *F16L 19/05* (2013.01); *F16J 15/10* (2013.01)

(58) Field of Classification Search
CPC ....... F16L 47/04; F16L 47/041; F16L 19/041; F16L 19/028
See application file for complete search history.

(56) References Cited

U.S. PATENT DOCUMENTS 5,996,636 A * 12/1999 Fukano ................. F16L 47/041
138/120
6,513,839 B2 * 2/2003 Nishio ................... F16L 47/041
285/919
(Continued)

FOREIGN PATENT DOCUMENTS

JP      2013100874 A  *  5/2013  ............ F16L 47/041
JP      2018168947 A      11/2018
(Continued)

OTHER PUBLICATIONS

International Search Report PCT/JP2021/009203 dated Apr. 27, 2021 (pp. 1-2).

*Primary Examiner* — Matthew Troutman
*Assistant Examiner* — Fannie C Kee
(74) *Attorney, Agent, or Firm* — Millen, White, Zelano & Branigan P.C.; William F. Nixon

(57) ABSTRACT

An inner ring of a pipe joint includes a first tapered surface formed at one axial end portion of an inner circumferential surface such that a diameter thereof gradually increases from another axial side toward one axial end thereof in a state before a bulge portion is press-fitted into an end portion of a tube. A diameter increase starting point of the first tapered surface is located in a range from a deformation starting point, which serves as a starting point from which an inner circumferential surface is deformed due to the bulge portion 5 receiving external force from the tube 8 when the bulge portion is press-fitted into the end portion of the tube, to a position, on the inner circumferential surface, corresponding to one axial end of an outer circumferential surface of a body portion.

7 Claims, 10 Drawing Sheets

(56) References Cited

U.S. PATENT DOCUMENTS

| | | | |
|---|---|---|---|
| 6,896,299 B1 | 5/2005 | Nishio | |
| 10,190,708 B2 * | 1/2019 | Fujii | F16L 47/041 |
| 10,436,364 B2 * | 10/2019 | Fujii | F16L 47/041 |
| 10,571,060 B2 * | 2/2020 | Fujii | F16L 19/041 |
| 2016/0061357 A1 * | 3/2016 | Fujii | F16L 47/041 |
| | | | 285/382.5 |
| 2016/0061360 A1 * | 3/2016 | Fujii | F16L 47/041 |
| | | | 285/382.5 |
| 2016/0061361 A1 * | 3/2016 | Fujii | F16L 19/028 |
| | | | 285/382.5 |
| 2016/0116096 A1 * | 4/2016 | Fujii | F16L 47/041 |
| | | | 285/386 |
| 2019/0331272 A1 | 10/2019 | Fujii et al. | |

FOREIGN PATENT DOCUMENTS

| | | | | |
|---|---|---|---|---|
| JP | 2020085204 A | * | 6/2020 | F16L 47/041 |
| WO | 2000028254 A1 | | 5/2000 | |

* cited by examiner

INNER RING AND PIPE JOINT

TECHNICAL FIELD

The present invention relates to an inner ring and a pipe joint.

BACKGROUND ART

In manufacturing processes in various technical fields such as semiconductor manufacturing, medical/pharmaceutical manufacturing, and food processing/chemical industries, in a pipe path through which fluids such as chemical solutions, high-purity liquids, ultrapure water, or cleaning solutions flow, for example, a pipe joint made of a synthetic resin is used as a connection structure that connects flow passages formed in tubes or fluid devices. As such a pipe joint, a pipe joint that includes an inner ring mounted on the inner circumferential side of an end portion of a tube, a cylindrical joint body mounted on the outer circumferential side of the end portion of the tube, and a union nut mounted on the outer circumferential side of the joint body, is known (see, for example, PATENT LITERATURE 1).

As shown in FIG. 5, an inner ring 110 in a conventional pipe joint 100 has a cylindrical body portion 111, a bulge portion 112 formed at one axial end portion of the body portion 111, and a press-fitting portion 113 formed at another axial end portion of the body portion 111. A fluid flow passage 114 is formed inside the inner ring 110. The bulge portion 112 is formed so as to project to the radially outer side with respect to the body portion 111, and is press-fitted into an end portion of a tube 120. The press-fitting portion 113 is formed so as to project in the axial direction from the body portion 111, and the press-fitting portion 113 is press-fitted into an end portion of a joint body 140 when a union nut 130 is tightened.

When the bulge portion 112 and the press-fitting portion 113 of the inner ring 110 are press-fitted into the end portion of the tube 120 and the end portion of the joint body 140, respectively, both end portions in the axial direction of the inner ring 110 are pressed toward the radially inner side, whereby both end portions in the axial direction of the inner circumferential surface of the inner ring 110 are deformed so as to fall down toward the radially inner side. At this time, when both end portions in the axial direction of the inner circumferential surface of the inner ring 110 protrude into the fluid flow passage 114, the replacement characteristics of a fluid flowing in the pipe joint 100 are reduced, causing adverse effects such as taking time for flushing the inside of the pipe joint 100.

Therefore, as shown in FIG. 6, tapered surfaces 115 and 116 are respectively formed at both end portions in the axial direction of the inner circumferential surface of the inner ring 110 such that the diameters thereof gradually increase from the axially inner side toward the axially outer ends thereof. Accordingly, even when both end portions in the axial direction of the inner ring 110 are pressed toward the radially inner side, both end portions in the axial direction of the inner circumferential surface of the inner ring 110 are inhibited from protruding into the fluid flow passage 114.

CITATION LIST

Patent Literature

PATENT LITERATURE 1: Japanese Laid-Open Patent Publication No. 2018-168947

SUMMARY OF THE INVENTION

Technical Problem

As shown in FIG. 7, at the one axial end portion of the inner ring 110, when a length L' in the axial direction of the tapered surface 115 is short, the deformation margin of the one axial end portion of the inner circumferential surface of the inner ring 110 to the radially inner side is insufficient. Therefore, as shown in FIG. 8, when the bulge portion 112 of the inner ring 110 is press-fitted into the end portion of the tube 120, the one axial end portion of the inner circumferential surface of the inner ring 110 cannot be inhibited from protruding into the fluid flow passage 114 side. In addition, although not shown, at the other axial end portion of the inner ring 110 as well, the same problem arises when the length in the axial direction of the tapered surface 116 is short.

As shown in FIG. 9, at the one axial end portion of the inner ring 110, when the length L' in the axial direction of the tapered surface 115 is long, the thickness (cross-sectional area) in the radial direction of the one axial end portion of the inner ring 110 is excessively small. Therefore, as shown in FIG. 10, when the bulge portion 112 of the inner ring 110 is press-fitted into the end portion of the tube 120, the one axial end portion of the inner circumferential surface of the inner ring 110 easily falls down toward the radially inner side and thus cannot be inhibited from protruding into the fluid flow passage 114. In addition, although not shown, at the other axial end portion of the inner ring 110 as well, the same problem arises when the length in the axial direction of the tapered surface 116 is long.

The present invention has been made in view of such circumstances, and an object of the present invention is to allow an end portion in the axial direction of the inner circumferential surface of an inner ring to be effectively inhibited from protruding into a fluid flow passage.

Solution to Problem (1) An inner ring of the present invention is an inner ring including: a bulge portion formed at one axial end portion such that an outer circumferential surface thereof projects toward a radially outer side, and to be press-fitted into an end portion of a tube; a press-fitting portion formed at another axial end portion and to be press-fitted into an end portion of a joint body; and a cylindrical body portion formed between the bulge portion and the press-fitting portion and having a constant outer diameter over an entirety in an axial direction, the outer diameter being smaller than a maximum outer diameter of the bulge portion, wherein a fluid flow passage is formed inside an inner circumferential surface of the inner ring, the inner ring includes a tapered surface formed at one axial end portion of the inner circumferential surface such that a diameter thereof gradually increases from another axial side toward one axial end thereof in a state before the bulge portion is press-fitted into the end portion of the tube, and a diameter increase starting point of the tapered surface is located in a range from a deformation starting point, which serves as a starting point from which the inner circumferential surface is deformed due to the bulge portion receiving external force from the tube when the bulge portion is press-fitted into the end portion of the tube, to a position, on the inner circumferential surface, corresponding to one axial end of an outer circumferential surface of the body portion.

In the inner ring of the present invention, the diameter increase starting point of the tapered surface formed at the one axial end portion of the inner circumferential surface of the inner ring is not located on the one axial side with respect to the deformation starting point which serves as a starting point from which the inner circumferential surface is deformed due to the bulge portion receiving the external force from the tube. Accordingly, the diameter increase starting point of the tapered surface can be inhibited from being deformed toward the radially inner side due to the external force, so that a deformation margin of the one axial end portion of the inner circumferential surface of the inner ring to the radially inner side can be ensured.

Moreover, the diameter increase starting point of the tapered surface is not located on the other axial side with respect to the position, on the inner circumferential surface, corresponding to the one axial end of the outer circumferential surface of the body portion. That is, the diameter increase starting point of the tapered surface is not located at a portion, of the inner ring, at which the thickness in the radial direction thereof is small. Accordingly, even though the tapered surface is formed, the thickness (cross-sectional area) in the radial direction of the one axial end portion of the inner ring can be inhibited from being excessively small, so that the degree of deformation of the one axial end portion of the inner circumferential surface of the inner ring to the radially inner side can be reduced.

Owing to the above, the one axial end portion of the inner circumferential surface of the inner ring can be effectively inhibited from protruding into the fluid flow passage.

(2) Preferably, a maximum outer diameter portion having a maximum outer diameter is formed at the outer circumferential surface of the bulge portion over a predetermined length in the axial direction, and the diameter increase starting point of the tapered surface is located in a range, in the inner circumferential surface, corresponding to a range of the predetermined length of the maximum outer diameter portion.

In this case, since the diameter increase starting point of the tapered surface is located at a portion, of the bulge portion, at which the thickness in the radial direction thereof is the largest, even though the tapered surface is formed, the degree of decrease in the thickness in the radial direction of the one axial end portion of the inner ring can be reduced. Accordingly, the degree of deformation of the one axial end portion of the inner circumferential surface of the inner ring to the radially inner side can be further reduced.

(3) Preferably, the deformation starting point is located at a position, on the inner circumferential surface, corresponding to one axial end of the maximum outer diameter portion, and the diameter increase starting point of the tapered surface is located on the deformation starting point.

In this case, the diameter increase starting point of the tapered surface can be inhibited from being deformed toward the radially inner side due to the external force, and the degree of decrease in the thickness in the radial direction of the one axial end portion of the inner ring can also be reduced as much as possible. Accordingly, the degree of deformation of the one axial end portion of the inner circumferential surface of the inner ring to the radially inner side can be further reduced.

(4) According to another aspect, an inner ring of the present invention is an inner ring including: a bulge portion formed at one axial end portion such that an outer circumferential surface thereof projects toward a radially outer side, and to be press-fitted into an end portion of a tube; a press-fitting portion formed at another axial end portion and to be press-fitted into an end portion of a joint body; and a cylindrical body portion formed between the bulge portion and the press-fitting portion and having a constant outer diameter over an entirety in an axial direction, the outer diameter being smaller than an outer diameter of the press-fitting portion, wherein a fluid flow passage is formed inside an inner circumferential surface of the inner ring, the inner ring includes a tapered surface formed at another axial end portion of the inner circumferential surface such that a diameter thereof gradually increases from one axial side toward another axial end thereof in a state before the press-fitting portion is press-fitted into the end portion of the joint body, and a diameter increase starting point of the tapered surface is located in a range from a deformation starting point, which serves as a starting point from which the inner circumferential surface is deformed due to the press-fitting portion receiving external force from the joint body when the press-fitting portion is press-fitted into the end portion of the joint body, to a position, on the inner circumferential surface, corresponding to another axial end of an outer circumferential surface of the body portion.

In the inner ring of the present invention, the diameter increase starting point of the tapered surface formed at the other axial end portion of the inner circumferential surface of the inner ring is not located on the other axial side with respect to the deformation starting point which serves as a starting point from which the inner circumferential surface is deformed due to the press-fitting portion receiving the external force from the joint body. Accordingly, the diameter increase starting point of the tapered surface can be inhibited from being deformed toward the radially inner side due to the external force, so that a deformation margin of the other axial end portion of the inner circumferential surface of the inner ring to the radially inner side can be ensured.

Moreover, the diameter increase starting point of the tapered surface is not located on the one axial side with respect to the position, on the inner circumferential surface, corresponding to the other axial end of the outer circumferential surface of the body portion. That is, the diameter increase starting point of the tapered surface is not located at a portion, of the inner ring, at which the thickness in the radial direction thereof is small. Accordingly, even though the tapered surface is formed, the thickness (cross-sectional area) in the radial direction of the other axial end portion of the inner ring can be inhibited from being excessively small, so that the degree of deformation of the other axial end portion of the inner circumferential surface of the inner ring to the radially inner side can be reduced.

Owing to the above, the other axial end portion of the inner circumferential surface of the inner ring can be effectively inhibited from protruding into the fluid flow passage.

(5) Preferably, the diameter increase starting point of the tapered surface is located on the deformation starting point.

In this case, the diameter increase starting point of the tapered surface can be inhibited from being deformed toward the radially inner side due to the external force, and the degree of decrease in the thickness in the radial direction of the other axial end portion of the inner ring can also be reduced as much as possible. Accordingly, the degree of deformation of the other axial end portion of the inner circumferential surface of the inner ring to the radially inner side can be further reduced.

(6) According to another aspect, a pipe joint of the present invention includes: a joint body having an external thread portion formed on an outer circumference thereof; a union nut having an internal thread portion formed on an inner circumference thereof and to be tightened to the external thread portion; and the inner ring according to any one of the above (1) to (5).

With the pipe joint of the present invention, the same advantageous effects as those of the inner ring are achieved.

Advantageous Effects of the Invention

According to the present invention, the end portion in the axial direction of the inner circumferential surface of the inner ring can be effectively inhibited from protruding into the fluid flow passage.

DETAILED DESCRIPTION

Next, preferred embodiments of the present invention will be described with reference to the accompanying drawings.

Entire Configuration of Pipe Joint

Figure 1:
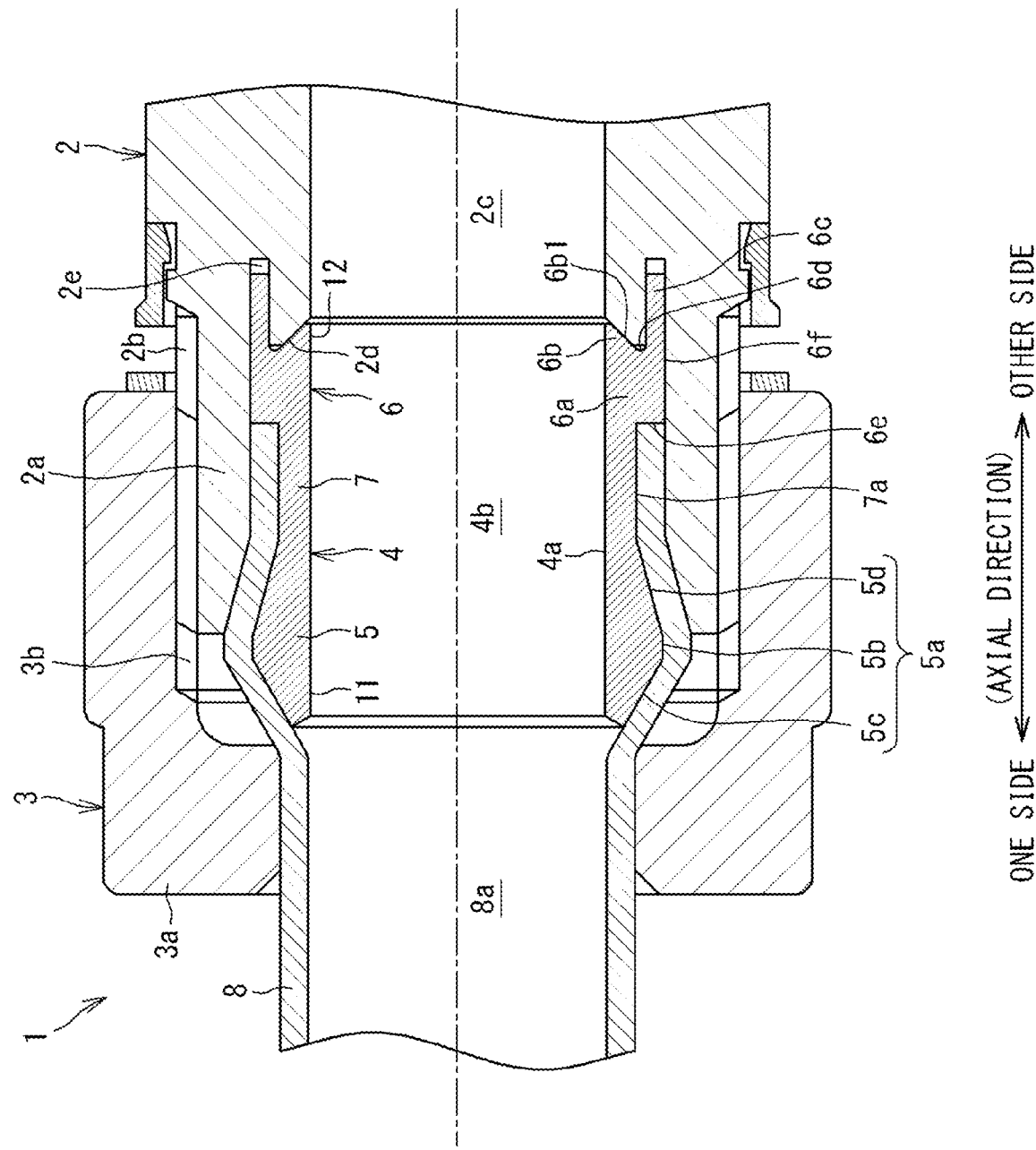
FIG. 1 is an axial cross-sectional view showing a pipe joint according to an embodiment of the present invention.

FIG. 1 is an axial cross-sectional view showing a pipe joint according to an embodiment of the present invention. In FIG. 1, a pipe joint 1 is used, for example, in a pipe path through which a chemical solution (fluid) used in a semiconductor manufacturing apparatus flows. The pipe joint 1 includes a joint body 2, a union nut 3, and an inner ring 4. Hereinafter, in the present embodiment, for convenience, the left side of FIG. 1 is referred to as one axial side, and the right side of FIG. 1 is referred to as another axial side (the same applies to FIG. 2 to FIG. 4).

The inner ring 4 is formed in a cylindrical shape, for example, from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like).

A fluid flow passage 4b is formed inside an inner circumferential surface 4a of the inner ring 4. The fluid flow passage 4b provides communication between a flow passage 8a formed inside a tube 8 and a flow passage 2c formed inside the joint body 2. The inner ring 4 includes a bulge portion 5 formed at one axial end portion thereof, a press-fitting portion 6 formed at another axial end portion thereof, and a cylindrical body portion 7 formed between the bulge portion 5 and the press-fitting portion 6.

The bulge portion 5 is press-fitted into an end portion of the tube 8, which is made of a synthetic resin material (PFA or the like), to increase the diameter of the end portion of the tube 8. The bulge portion 5 has an outer circumferential surface 5a which is formed in a mountain shape so as to project toward the radially outer side. The outer circumferential surface 5a of the bulge portion 5 has a maximum outer diameter portion 5b having a maximum outer diameter, a first reduced-diameter portion 5c, and a second reduced-diameter portion 5d.

Figure 2:
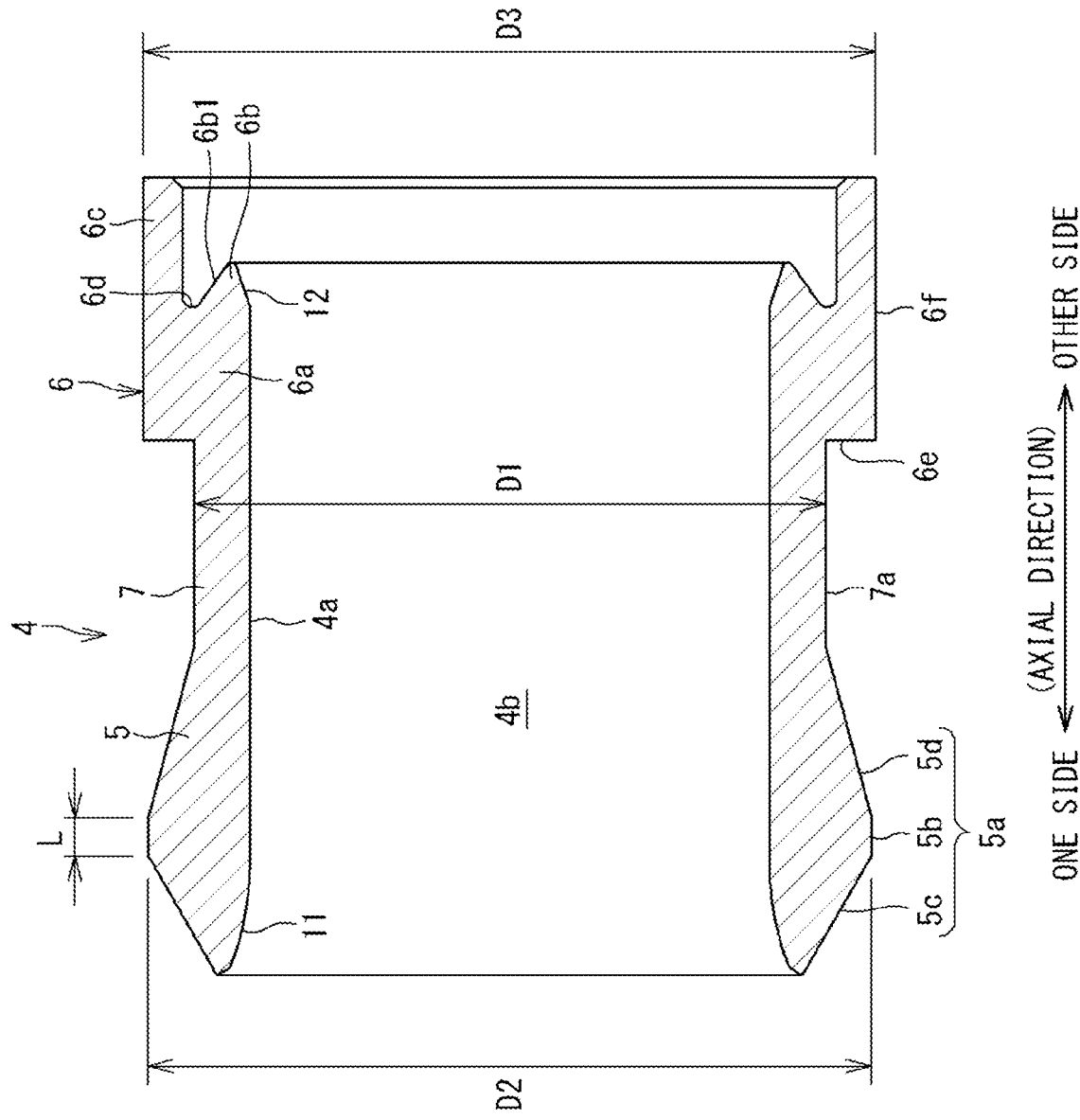
FIG. 2 is an axial cross-sectional view showing an inner ring of the pipe joint.

The maximum outer diameter portion 5b is formed over a predetermined length L in the axial direction (see FIG. 2). The first reduced-diameter portion 5c is formed such that the diameter thereof gradually decreases from one axial end of the maximum outer diameter portion 5b toward the one axial side. The second reduced-diameter portion 5d is formed such that the diameter thereof gradually decreases from the other axial end of the maximum outer diameter portion 5b toward the other axial side. Another axial end of the second reduced-diameter portion 5d is connected to an outer circumferential surface 7a of the body portion 7.

The press-fitting portion 6 is press-fitted into an end portion (one axial end portion) of the joint body 2. The press-fitting portion 6 includes a cylindrical press-fitting body 6a, an annular primary sealing portion 6b, and a cylindrical secondary sealing portion 6c.

The press-fitting body 6a is press-fitted into a receiving portion 2a (described later) of the joint body 2.

The primary sealing portion 6b is formed so as to project from the radially inner side of another axial end of the press-fitting body 6a toward the other axial side. An outer circumferential surface 6b1 of the primary sealing portion 6b is formed such that the diameter thereof gradually decreases from one axial end thereof to the other axial end thereof. The primary sealing portion 6b is press-fitted into a primary sealing groove 2d (described later) of the joint body 2.

The secondary sealing portion 6c is formed so as to project from the radially outer side of the other axial end of the press-fitting body 6a toward the other axial side. The secondary sealing portion 6c is press-fitted into a secondary sealing groove 2e (described later) of the joint body 2. An annular groove 6d is formed between the primary sealing portion 6b and the secondary sealing portion 6c so as to have an arc cross-sectional shape. The outer diameter of the secondary sealing portion 6c is equal to the outer diameter of the press-fitting body 6a. Accordingly, the press-fitting portion 6 (the press-fitting body 6a and the secondary sealing portion 6c) has a constant outer diameter D3 (see FIG. 2) over the entirety in the axial direction.

The body portion 7 of the inner ring 4 has a constant outer diameter D1 over the entirety in the axial direction, and the outer diameter D1 is smaller than a maximum outer diameter D2 of the bulge portion 5 and smaller than the outer diameter D3 of the press-fitting portion 6 (see FIG. 2). The outer circumferential surface 7a of the body portion 7 is connected to an outer circumferential surface 6f of the press-fitting portion 6 via a step surface 6e formed at one axial end of the press-fitting portion 6.

The joint body 2 is formed in a cylindrical shape, for example, from a synthetic resin material such as PVC, PP, PE, or a fluorine resin (PFA, PTFE, or the like). The inner diameter of the joint body 2 is set to substantially the same dimension as the inner diameter of the inner ring 4 such that the movement of the chemical solution is not hindered. The cylindrical receiving portion 2a is formed at one axial end portion of the joint body 2. The press-fitting portion 6 of the inner ring 4 in which the bulge portion 5 is press-fitted into the end portion of the tube 8 is press-fitted to the inner circumference of the receiving portion 2a. Accordingly, the one axial end portion of the joint body 2 is mounted on the outer circumference of the end portion of the tube 8. An external thread portion 2b is formed on the outer circumference of the receiving portion 2a.

The joint body 2 has the annular primary sealing groove 2d and the cylindrical secondary sealing groove 2e which are formed on the other axial side with respect to the receiving portion 2a. The primary sealing groove 2d is formed on the radially inner side of the joint body 2 in a tapered shape that is cut such that the diameter thereof gradually decreases from one axial end thereof toward the other axial end thereof. The secondary sealing groove 2e is formed on the radially outer side with respect to the primary sealing groove 2d in the joint body 2.

The union nut 3 is formed in a cylindrical shape, for example, from a synthetic resin material such as PVC, PP, PE, or a fluorine resin (PFA, PTFE, or the like). The union nut 3 has a pressing portion 3a formed at the one axial end portion thereof so as to project toward the radially inner side, and an internal thread portion 3b formed on the inner circumference of the other axial end portion thereof. The internal thread portion 3b is tightened to the external thread portion 2b of the joint body 2. By the tightening, the union nut 3 is attached to the joint body 2, and another axial end portion of the pressing portion 3a also presses the outer circumferential surface of the tube 8 which bulges on the radially outer side by the bulge portion 5 of the inner ring 4.

With the above configuration, when the internal thread portion 3b of the union nut 3 is tightened to the external thread portion 2b of the joint body 2, the primary sealing portion 6b and the secondary sealing portion 6c of the inner ring 4 are press-fitted into the primary sealing groove 2d and the secondary sealing groove 2e of the joint body 2, respectively, so that sealing performance at the connection portion between the inner ring 4 and the joint body 2 can be ensured. In addition, the pressing portion 3a of the union nut 3 can prevent the tube 8 from being removed.

Inner Circumferential Surface of Inner Ring

FIG. 2 is an axial cross-sectional view showing the inner ring 4, and shows a state before the bulge portion 5 and the press-fitting portion 6 are press-fitted into the end portion of the tube 8 and the end portion of the joint body 2, respectively. As shown in FIG. 2, the inner ring 4 includes a first tapered surface 11 formed at one axial end portion of the inner circumferential surface 4a, and a second tapered surface 12 formed at another axial end portion of the inner circumferential surface 4a.

The first tapered surface 11 is formed at the one axial end portion of the inner circumferential surface 4a such that the diameter thereof gradually increases from the other axial side toward one axial end thereof. The first tapered surface 11 of the present embodiment is formed, for example, in a curved surface shape. The first tapered surface 11 may be formed in a flat surface shape.

The second tapered surface 12 is formed at the other axial end portion of the inner circumferential surface 4a such that the diameter thereof gradually increases from the one axial side thereof toward another axial end thereof. The second tapered surface 12 of the present embodiment is formed, for example, in a flat surface shape. The second tapered surface 12 may be formed in a curved surface shape.

Figure 3:
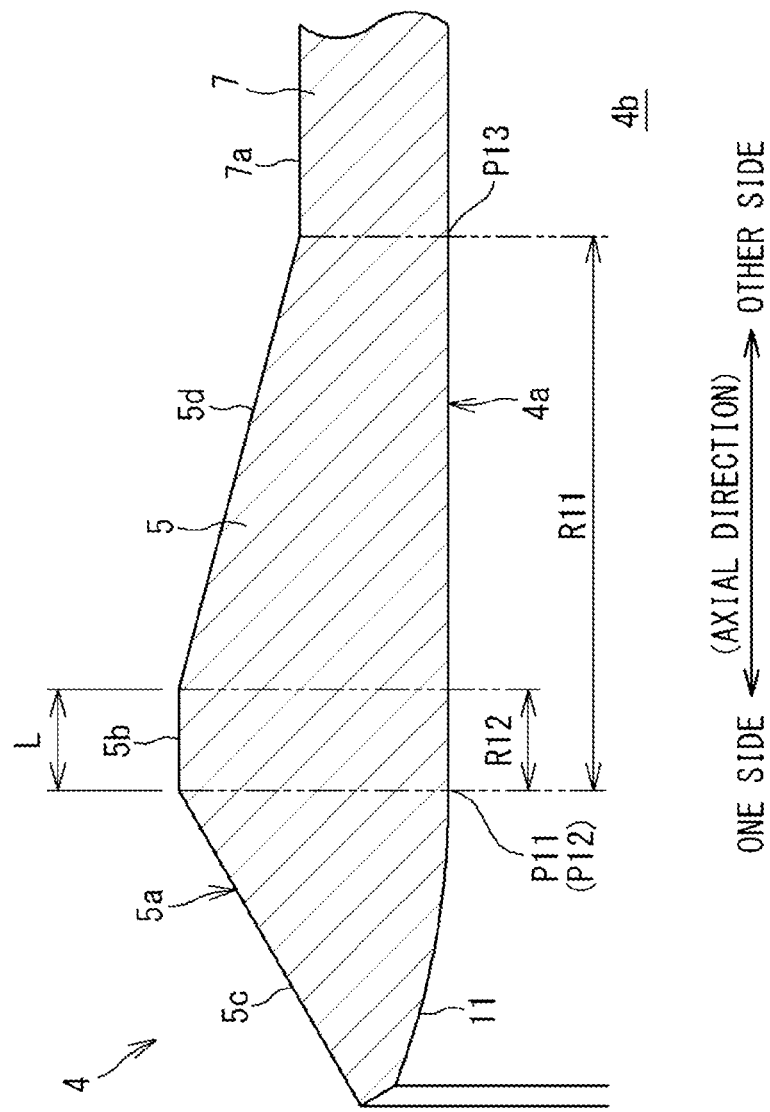
FIG. 3 an enlarged cross-sectional view of a main part of FIG. 2 showing a first tapered surface at an inner circumferential surface of the inner ring.

FIG. 3 is an enlarged cross-sectional view of a main part of FIG. 2 showing the first tapered surface 11 at the inner circumferential surface 4a of the inner ring 4. In FIG. 3, a diameter increase starting point P11 of the first tapered surface 11 is preferably located in a range R11 from a deformation starting point P12 of the inner circumferential surface 4a to a position P13, on the inner circumferential surface 4a, corresponding to one axial end of the outer circumferential surface 7a of the body portion 7. Here, the "in a range R11 from a deformation starting point P12 . . . to a position P13" means to also include the position on the deformation starting point P12 and the position on the position P13.

The deformation starting point P12 is a position serving as a starting point from which the one axial end portion of the inner circumferential surface 4a of the inner ring 4 is deformed so as to fall down toward the radially inner side due to the bulge portion 5 receiving external force from the tube 8 and the union nut 3 when the bulge portion 5 is press-fitted into the end portion of the tube 8 and when the union nut 3 (internal thread portion 3b) is tightened to the joint body 2 (external thread portion 2b). Therefore, at the one axial end portion of the inner circumferential surface 4a of the inner ring 4, a portion on the one axial side with respect to the deformation starting point P12 is deformed so as to fall down toward the radially inner side. The deformation starting point P12 in the present embodiment is a position, on the inner circumferential surface 4a, corresponding to the one axial end of the maximum outer diameter portion 5b in the outer circumferential surface 5a of the bulge portion 5.

When the diameter increase starting point P11 of the first tapered surface 11 is located in the range R11, the following advantageous effects are achieved.

The diameter increase starting point P11 of the first tapered surface 11 is not located on the one axial side with respect to the deformation starting point P12. Accordingly, the diameter increase starting point P11 of the first tapered surface 11 can be inhibited from being deformed toward the radially inner side due to the external force from the tube 8 and the union nut 3, so that a deformation margin of the one axial end portion of the inner circumferential surface 4a of the inner ring 4 to the radially inner side can be ensured.

Moreover, the diameter increase starting point P11 of the first tapered surface 11 is not located on the other axial side with respect to the position P13. That is, the diameter increase starting point P11 of the first tapered surface 11 is not located at a portion, of the inner ring 4, at which the thickness in the radial direction thereof is small. Accordingly, even though the first tapered surface 11 is formed, the thickness (cross-sectional area) in the radial direction of the one axial end portion of the inner ring 4 can be inhibited from being excessively small, so that the degree of deformation of the one axial end portion of the inner circumferential surface 4a of the inner ring 4 to the radially inner side can be reduced.

Therefore, when the diameter increase starting point P11 of the first tapered surface 11 is located in the range R11, the one axial end portion of the inner circumferential surface 4a of the inner ring 4 can be effectively inhibited from protruding into the fluid flow passage 4b.

The diameter increase starting point P11 of the first tapered surface 11 is further preferably located in a range R12, in the inner circumferential surface 4a, corresponding to the range of a length L of the maximum outer diameter portion 5b in the outer circumferential surface 5a of the bulge portion 5. In this case, since the diameter increase starting point P11 of the first tapered surface 11 is located at a portion, of the bulge portion 5, at which the thickness in the radial direction thereof is the largest, even though the first tapered surface 11 is formed, the degree of decrease in the thickness in the radial direction of the one axial end portion of the inner ring 4 can be reduced. Accordingly, the degree of deformation of the one axial end portion of the inner circumferential surface 4a of the inner ring 4 to the radially inner side can be further reduced.

The diameter increase starting point P11 of the first tapered surface 11 in the present embodiment is located on the deformation starting point P12 in the range R12. In this case, the diameter increase starting point P11 of the first tapered surface 11 can be inhibited from being deformed toward the radially inner side due to the external force, and the degree of decrease in the thickness in the radial direction of the one axial end portion of the inner ring 4 can also be reduced as much as possible. Accordingly, the degree of deformation of the one axial end portion of the inner circumferential surface 4a of the inner ring 4 to the radially inner side can be further reduced.

As shown in FIG. 1, when the bulge portion 5 is press-fitted into the end portion of the tube 8 or when external force is generated by tightening the union nut 3, the entire first tapered surface 11 is deformed so as to fall down toward the radially inner side, whereby the first tapered surface 11 in the present embodiment extends straight in the axial direction along the inner circumferential surface 4a. Therefore, when the bulge portion 5 is press-fitted into the end portion of the tube 8, even if an axial part of the inner circumferential surface 4a of the inner ring 4 is deformed so as to fall down toward the radially inner side, the axial part of the inner circumferential surface 4a does not protrude into the fluid flow passage 4b.

Figure 4:
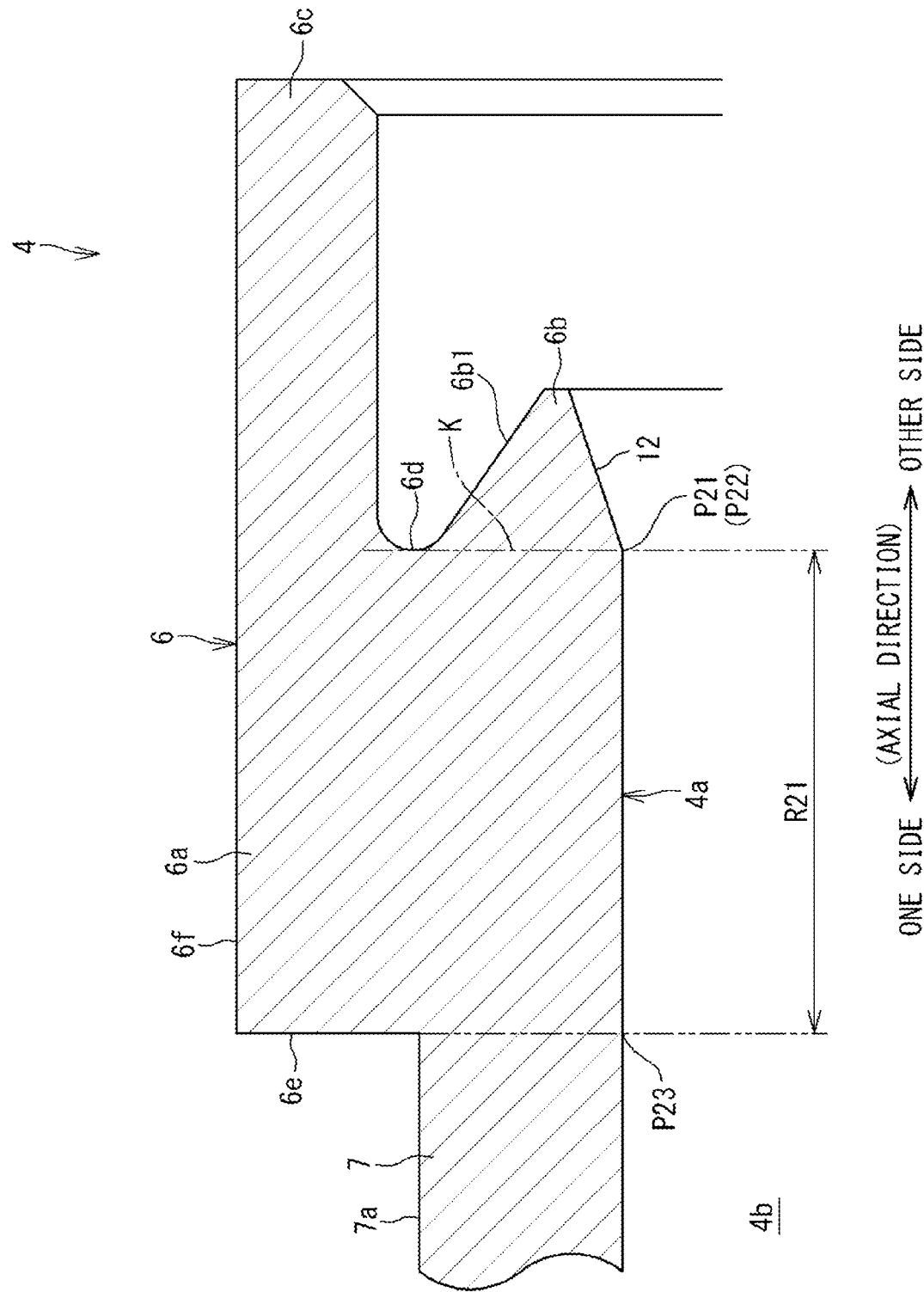
FIG. 4 is an enlarged cross-sectional view of a main part of FIG. 2 showing a second tapered surface at the inner circumferential surface of the inner ring.
Figure 5:
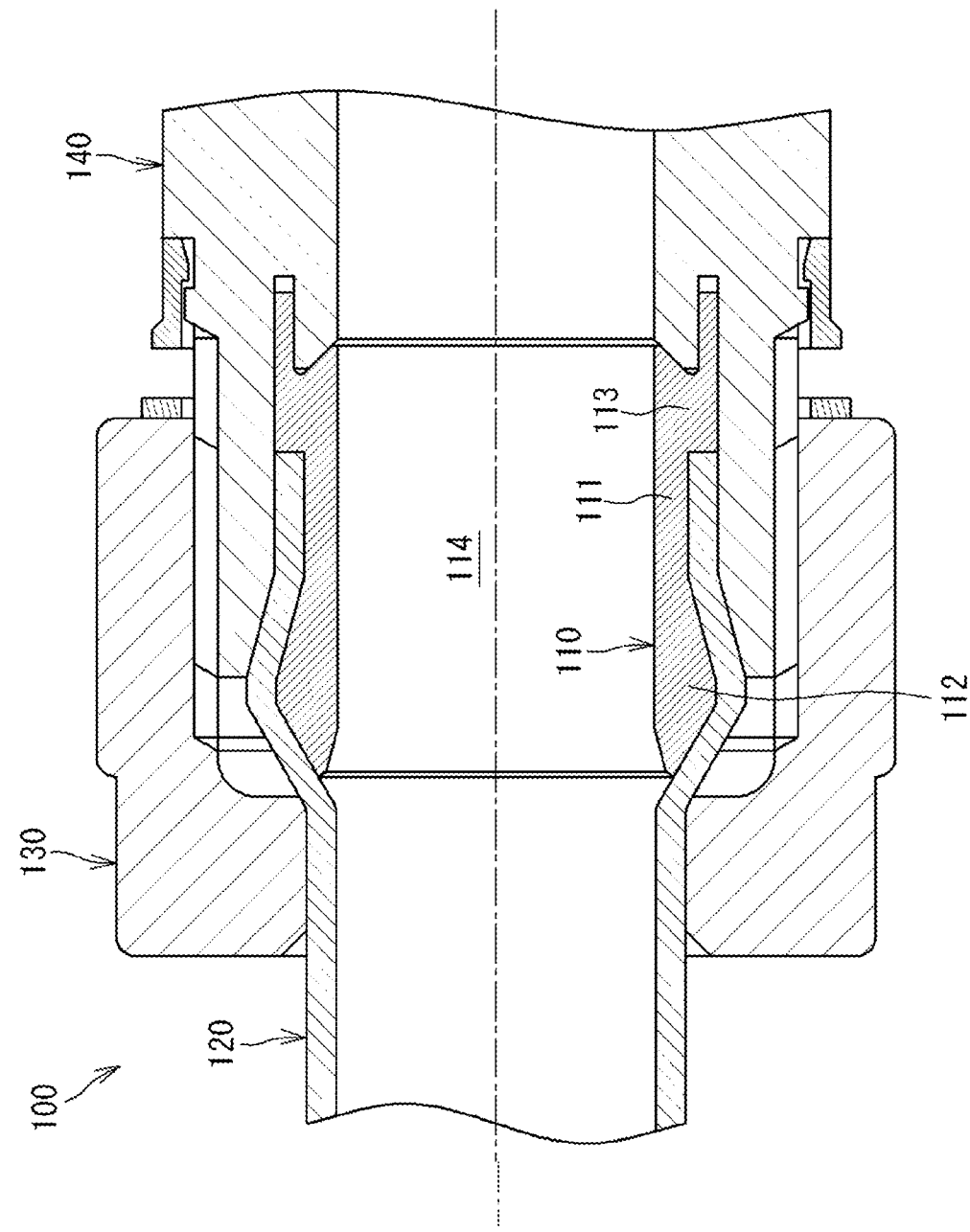
FIG. 5 is an axial cross-sectional view showing a conventional pipe joint.
Figure 6:
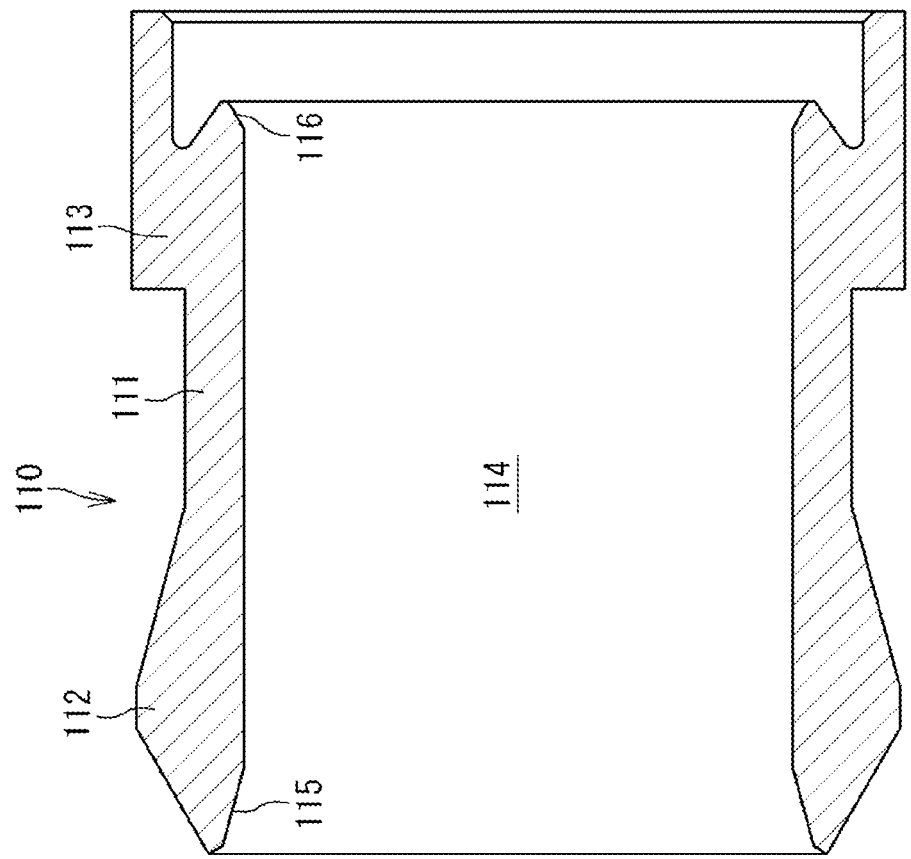
FIG. 6 is an axial cross-sectional view showing a conventional inner ring.
Figure 7:
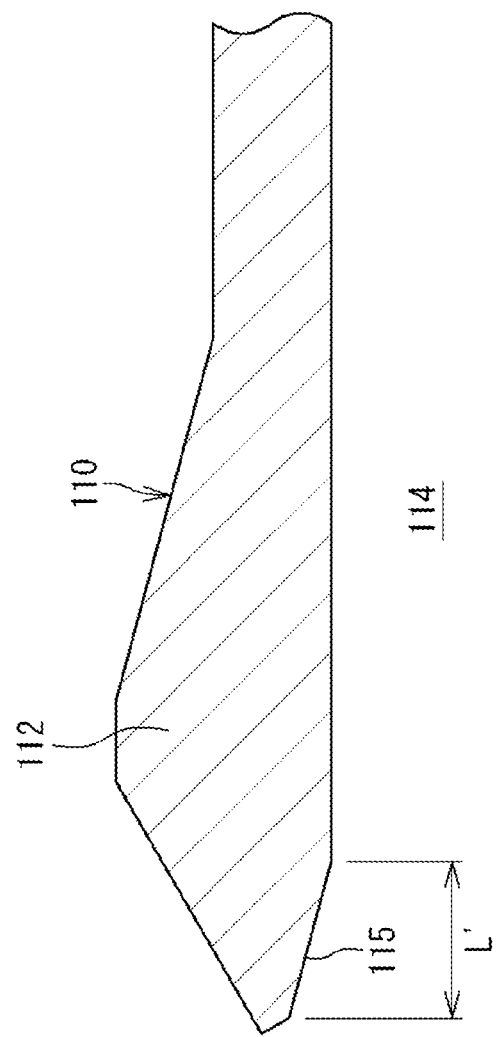
FIG. 7 is an enlarged cross-sectional view showing the case where a tapered surface formed at the inner circumferential surface of the conventional inner ring is short in the axial direction.
Figure 8:
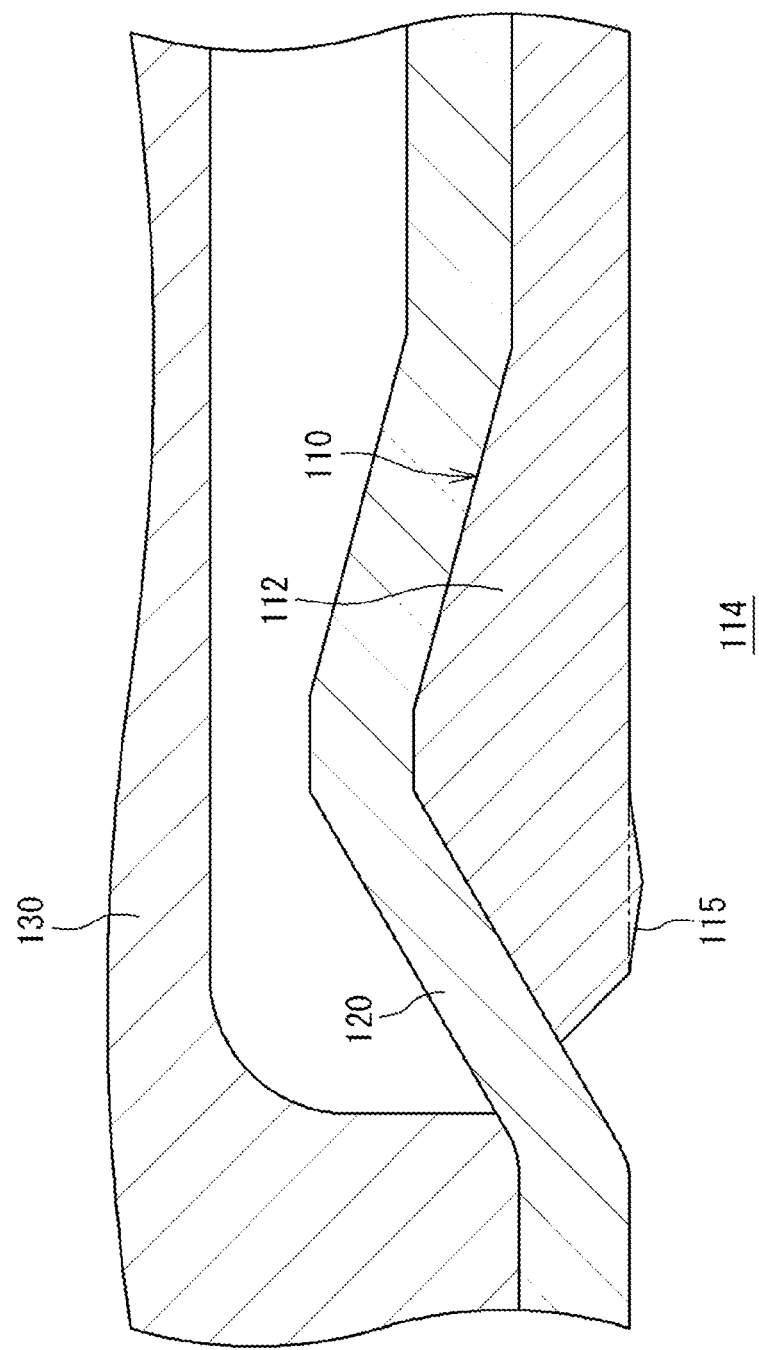
FIG. 8 is an enlarged cross-sectional view showing a state where the tapered surface of the inner ring in FIG. 7 is deformed.
Figure 9:
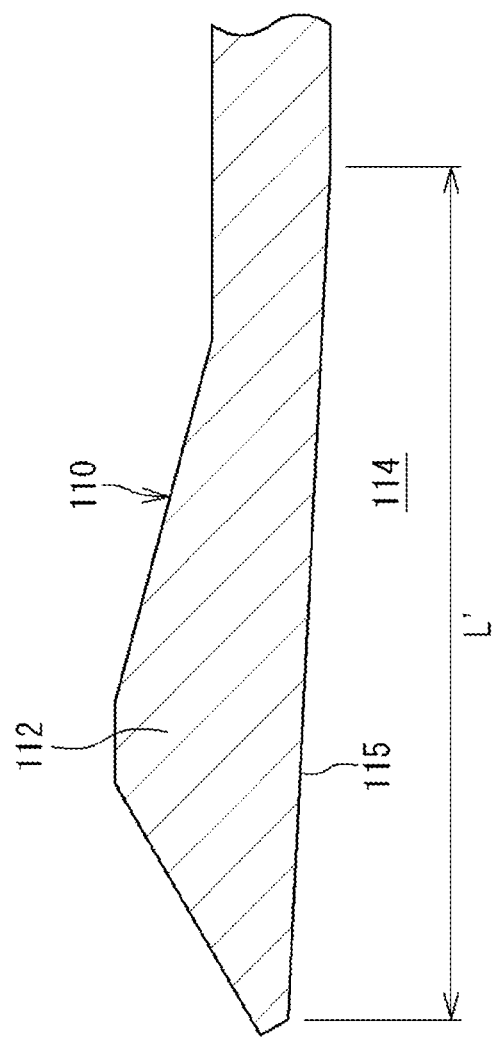
FIG. 9 is an enlarged cross-sectional view showing the case where the tapered surface formed at the inner circumferential surface of the conventional inner ring is long in the axial direction.
Figure 10:
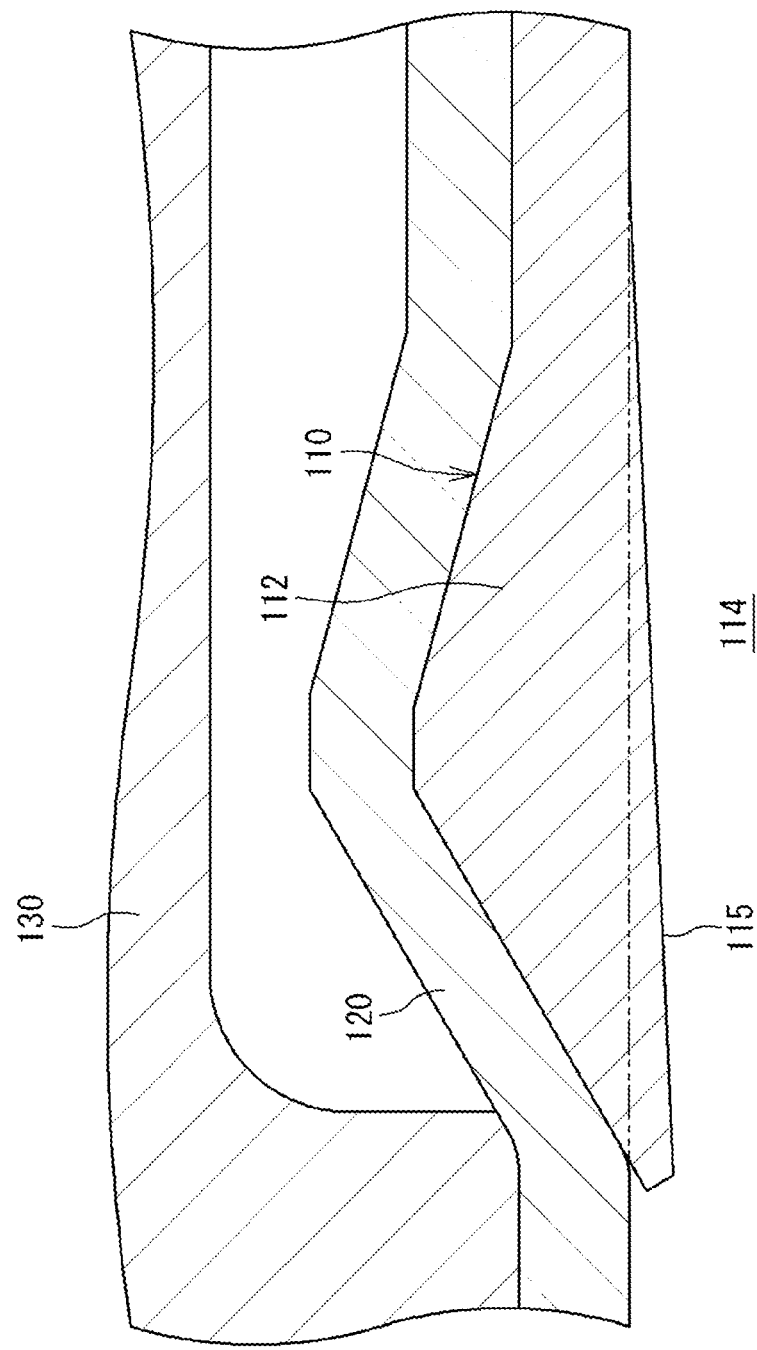
FIG. 10 is an enlarged cross-sectional view showing a state where the tapered surface of the inner ring in FIG. 9 is deformed.

FIG. 4 is an enlarged cross-sectional view of a main part of FIG. 2 showing the second tapered surface 12 at the inner circumferential surface 4a of the inner ring 4. In FIG. 4, a diameter increase starting point P21 of the second tapered surface 12 is preferably located in a range R21 from a deformation starting point P22 of the inner circumferential surface 4a to a position P23, on the inner circumferential surface 4a, corresponding to the other axial end of the outer circumferential surface 7a of the body portion 7. Here, the "in a range R21 from a deformation starting point P22 . . . to a position P23" means to also include the position on the deformation starting point P22 and the position on the position P23.

The deformation starting point P22 is a position serving as a starting point from which the other axial end portion of the inner circumferential surface 4a of the inner ring 4 is deformed so as to fall down toward the radially inner side due to the primary sealing portion 6b of the press-fitting portion 6 receiving external force from the joint body 2 when the press-fitting portion 6 is press-fitted into the end portion of the joint body 2, in particular, when the primary sealing portion 6b is press-fitted into the primary sealing groove 2d. Therefore, at the other axial end portion of the inner circumferential surface 4a of the inner ring 4, a portion on the other axial side with respect to the deformation starting point P22 is deformed so as to fall down toward the radially inner side.

When the diameter increase starting point P21 of the second tapered surface 12 is located in the range R21, the following advantageous effects are achieved.

The diameter increase starting point P21 of the second tapered surface 12 is not located on the other axial side with respect to the deformation starting point P22. Accordingly, the diameter increase starting point P21 of the second tapered surface 12 can be inhibited from being deformed toward the radially inner side due to the external force from the joint body 2, so that a deformation margin of the other axial end portion of the inner circumferential surface 4a of the inner ring 4 to the radially inner side can be ensured.

Moreover, the diameter increase starting point P21 of the second tapered surface 12 is not located on the one axial side with respect to the position P23, on the inner circumferential surface 4a, corresponding to the other axial end of the outer circumferential surface 7a of the body portion 7. That is, the diameter increase starting point P21 of the second tapered surface 12 is not located at a portion, of the inner ring 4, at which the thickness in the radial direction thereof is small. Accordingly, even though the second tapered surface 12 is formed, the thickness (cross-sectional area) in the radial direction of the other axial end portion of the inner ring 4 can be inhibited from being excessively small, so that the degree of deformation of the other axial end portion of the inner circumferential surface 4a of the inner ring 4 to the radially inner side can be reduced.

Therefore, when the diameter increase starting point P21 of the second tapered surface 12 is located in the range R21, the other axial end portion of the inner circumferential surface 4a of the inner ring 4 can be effectively inhibited from protruding into the fluid flow passage 4b.

In the present embodiment, the deformation starting point P22 is located at the point of intersection of the inner circumferential surface 4a and a virtual tangent line K which is tangent to the annular groove 6d and extends in the radial direction. The diameter increase starting point P21 of the second tapered surface 12 in the present embodiment is located on the deformation starting point P22 in the range R21. In this case, the diameter increase starting point P21 of the second tapered surface 12 can be inhibited from being deformed toward the radially inner side due to the external force, and the degree of decrease in the thickness in the radial direction of the other axial end portion of the inner ring 4 can also be reduced as much as possible. Accordingly, the degree of deformation of the other axial end portion of the inner circumferential surface 4a of the inner ring 4 to the radially inner side can be further reduced.

As shown in FIG. 1, when the press-fitting portion 6 is press-fitted into the end portion of the joint body 2, the entire second tapered surface 12 is deformed so as to fall down toward the radially inner side, whereby the second tapered surface 12 in the present embodiment extends straight in the axial direction along the inner circumferential surface 4a. Therefore, when the press-fitting portion 6 is press-fitted into the end portion of the joint body 2, even if the other axial end portion of the inner circumferential surface 4a of the inner ring 4 is deformed so as to fall down toward the radially inner side, the other axial end portion does not protrude into the fluid flow passage 4b.

Others

The maximum outer diameter portion 5b in the outer circumferential surface 5a of the bulge portion 5 of the above embodiment is formed over the predetermined length L in the axial direction, but may be formed only at a point in the axial direction. In addition, the press-fitting portion 6 of the above embodiment includes the press-fitting body 6a, the primary sealing portion 6b, and the secondary sealing portion 6c, but it is sufficient that the press-fitting portion 6 includes at least the primary sealing portion 6b. In addition, the pipe joint 1 and the inner ring 4 of the present invention can also be applied to the liquid crystal/organic EL field, the medical/pharmaceutical field, automotive-related fields, etc., in addition to a semiconductor manufacturing apparatus. Moreover, only either the first tapered surface 11 on the bulge portion 5 side or the second tapered surface 12 on the press-fitting portion 6 side may be applied to the inner ring 4.

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST 1 pipe joint
2 joint body
2d primary sealing groove
2e secondary sealing groove
3 union nut
4 inner ring
4a inner circumferential surface
4b fluid flow passage
5 bulge portion
5a outer circumferential surface
5b maximum outer diameter portion
6 press-fitting portion
7 body portion
7a outer circumferential surface
8 tube
11 first tapered surface (tapered surface)
12 second tapered surface (tapered surface)
P11, P21 diameter increase starting point
P12, P22 deformation starting point
P13, P23 position on inner circumferential surface

The invention claimed is:

1. An inner ring comprising:
a bulge portion formed at one axial end portion such that an outer circumferential surface thereof projects toward a radially outer side, and to be press-fitted into an end portion of a tube;
a press-fitting portion formed at another axial end portion and to be press-fitted into an end portion of a joint body; and
a cylindrical body portion formed between the bulge portion and the press-fitting portion and having a constant outer diameter over an entirety in an axial direction, the outer diameter being smaller than a maximum outer diameter of the bulge portion, wherein
a fluid flow passage is formed inside an inner circumferential surface of the inner ring,
the inner ring includes a tapered surface formed at the one axial end portion of the inner circumferential surface such that a diameter thereof gradually increases from the another axial side toward the one axial end thereof in a state before the bulge portion is press-fitted into the end portion of the tube,
a maximum outer diameter portion having a constant maximum outer diameter is formed at the outer circumferential surface of the bulge portion over a predetermined length in the axial direction,
a deformation starting point, which serves as a starting point from which the inner circumferential surface is deformed due to the bulge portion receiving external force from the tube when the bulge portion is press-fitted into the end portion of the tube, is located at a position, on the inner circumferential surface, corresponding to one axial end of the maximum outer diameter portion, and
a diameter increase starting point of the tapered surface is located in a range from the deformation starting point to a position, on the inner circumferential surface, corresponding to the one axial end of an outer circumferential surface of the body portion.

2. The inner ring according to claim 1, wherein
the diameter increase starting point of the tapered surface is located in a range, in the inner circumferential surface, corresponding to a range of the predetermined length of the maximum outer diameter portion.

3. The inner ring according to claim 2, wherein
the diameter increase starting point of the tapered surface is located on the deformation starting point.

4. An inner ring comprising:
a bulge portion formed at one axial end portion such that an outer circumferential surface thereof projects toward a radially outer side, and to be press-fitted into an end portion of a tube;
a press-fitting portion formed at another axial end portion and to be press-fitted into an end portion of a joint body; and
a cylindrical body portion formed between the bulge portion and the press-fitting portion and having a constant outer diameter over an entirety in an axial direction, the outer diameter being smaller than an outer diameter of the press-fitting portion, wherein
a fluid flow passage is formed inside an inner circumferential surface of the inner ring,
the inner ring includes a tapered surface formed at the another axial end portion of the inner circumferential surface such that a diameter thereof gradually increases from the one axial side toward the another axial end thereof in a state before the press-fitting portion is press-fitted into the end portion of the joint body,
the press-fitting portion includes a primary sealing portion and a secondary sealing portion located radially outward of the primary sealing portion,
an annular groove having an arc cross-sectional shape is formed between the primary sealing portion and the secondary sealing portion,
a deformation starting point, which serves as a starting point from which the inner circumferential surface is deformed due to the press-fitting portion receiving external force from the joint body when the press-fitting portion is press-fitted into the end portion of the joint body, is located at a point of intersection of the inner circumferential surface and a virtual tangent line K which is tangent to the annular groove and extends in a radial direction of the inner circumferential surface, and
a diameter increase starting point of the tapered surface is located in a range from the deformation starting point to a position, on the inner circumferential surface, corresponding to another axial end of an outer circumferential surface of the body portion.

5. The inner ring according to claim 4, wherein the diameter increase starting point of the tapered surface is located on the deformation starting point.

6. A pipe joint comprising:
a joint body having an external thread portion formed on an outer circumference thereof;
a union nut having an internal thread portion formed on an inner circumference thereof and to be tightened to the external thread portion; and
the inner ring according to claim 1.

7. A pipe joint comprising:
a joint body having an external thread portion formed on an outer circumference thereof;
a union nut having an internal thread portion formed on an inner circumference thereof and to be tightened to the external thread portion; and
the inner ring according to claim 4.

* * * * *